April 7, 1942.  W. G. BOETTINGER  2,279,105
TEMPERATURE COMPENSATING MEANS FOR INSTRUMENTS
Filed Jan. 4, 1940  4 Sheets-Sheet 1
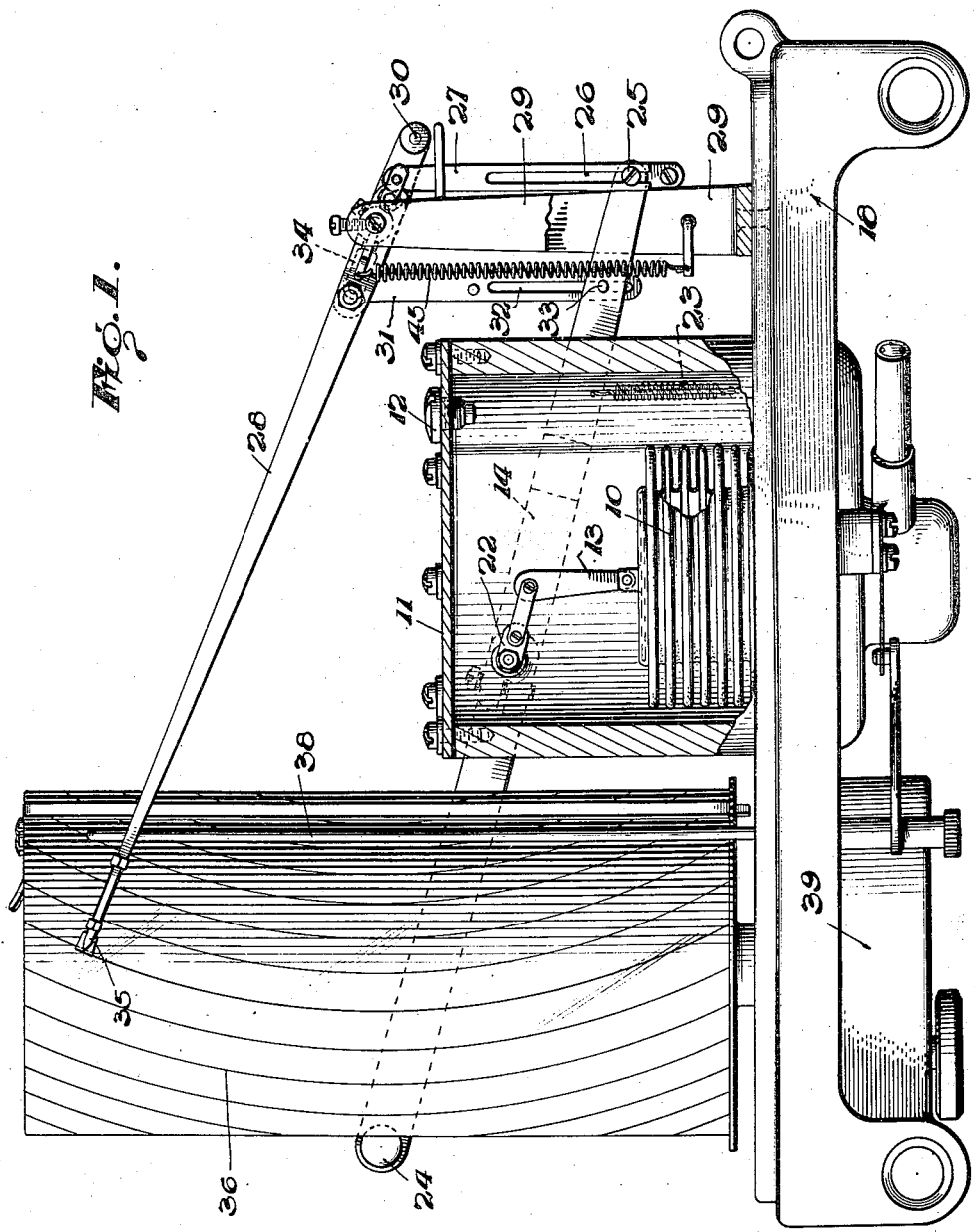
Inventor
William G. Boettinger.
By Stephen Cerstvik.
Attorney April 7, 1942. W. G. BOETTINGER 2,279,105
TEMPERATURE COMPENSATING MEANS FOR INSTRUMENTS
Filed Jan. 4, 1940 4 Sheets-Sheet 2
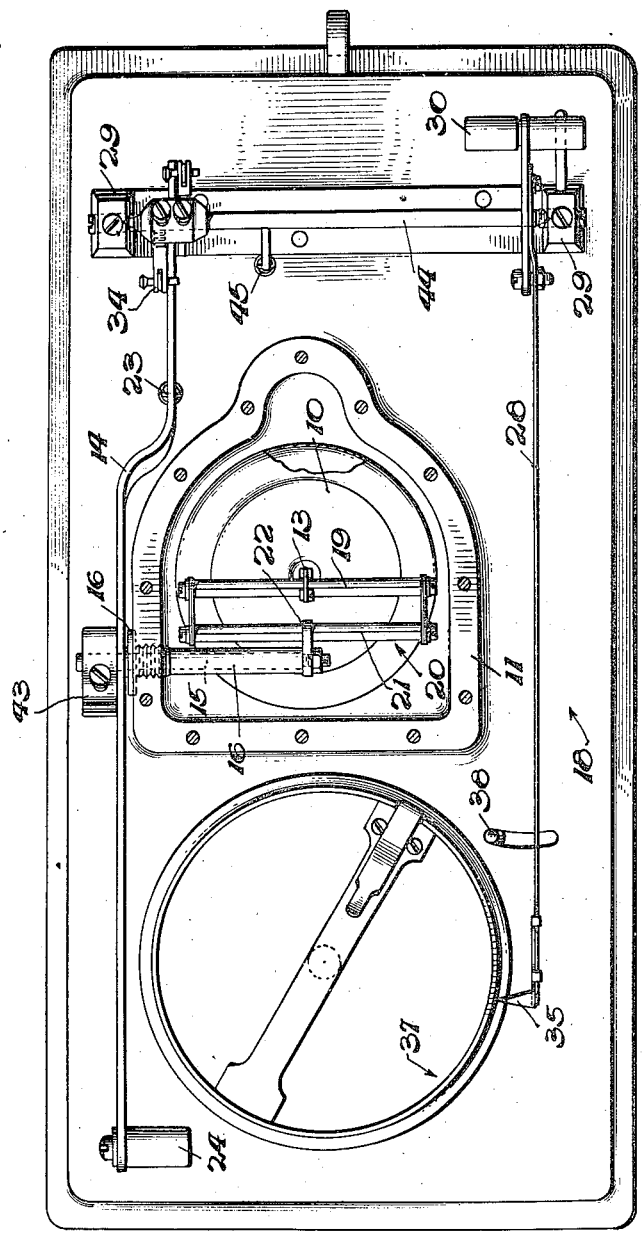
Inventor
William G. Boettinger.
By Stephen Cerstvik
Attorney

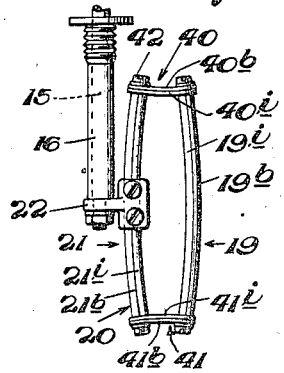
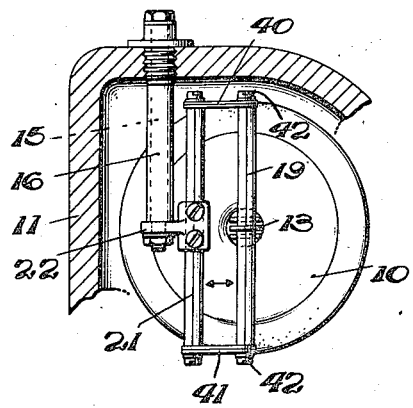
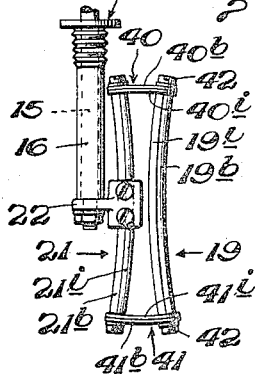
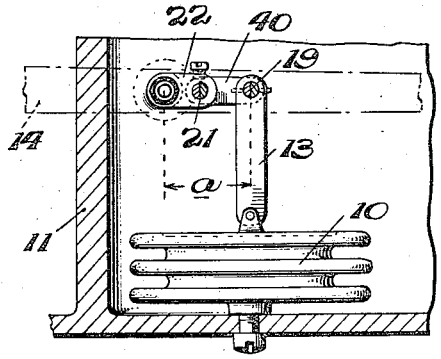
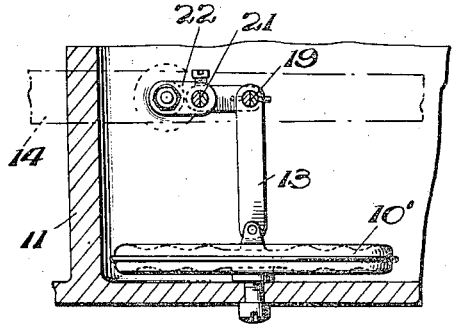

April 7, 1942. W. G. BOETTINGER 2,279,105
TEMPERATURE COMPENSATING MEANS FOR INSTRUMENTS
Filed Jan. 4, 1940 4 Sheets-Sheet 4

Inventor
William G. Boettinger.
By Stephen Cerstvik
Attorney

Patented Apr. 7, 1942

2,279,105

UNITED STATES PATENT OFFICE 2,279,105

TEMPERATURE COMPENSATING MEANS FOR INSTRUMENTS

William G. Boettinger, Baltimore, Md., assignor to Bendix Aviation Corporation, South Bend, Ind., a corporation of Delaware Application January 4, 1940, Serial No. 312,433

11 Claims. (Cl. 73—4)

This invention relates to motion transmitting means and more particularly to means for automatically introducing corrections in the indications of high precision instruments for the purpose of compensating for changes of temperature.

It is an object of the present invention to provide novel means for pressure indicating or recording instruments such, for example, as barographs, altimeters, air speed recorders, aneroid barometers, manifold pressure recorders, altigraphs, and the like, so as to compensate for errors due to temperature changes.

Another object of the invention is to provide a novel pressure measuring instrument which is capable of giving correct indications over a wide range of temperatures and pressures.

A further object is to provide novel simplified means which are readily adjustable, whereby a pressure responsive instrument may be adjusted to give a correct indication of the existing pressure irrespective of the temperature of the surrounding air.

Still another object is to provide a novel means whereby the motion amplification ratio of a system of levers may be varied in accordance with changes in temperature.

A still further object is to provide a novel pressure measuring instrument wherein means are provided for automatically varying the amplification of the movement of the pressure responsive element to introduce corrections necessary to compensate errors produced by changes in temperature.

Still another object is to provide a pressure measuring instrument embodying novel means for preventing transmission to the indicating element of the instrument of motion of the pressure responsive element which is caused by temperature changes.

A still further object of the invention is to provide a device in a pressure recording instrument, which will cause the recording pen to traverse the same linear distance on the chart for a given change in pressure whether the instrument be hot or cold.

The above and further objects and features of the invention will more fully appear from the following detailed description, when the same is read in connection with the accompanying drawings. It is to be expressly understood, however, that the drawings are for the purposes of illustration only and are not intended as a definition of the limits of the invention, reference being primarily had for this latter purpose to the appended claims.

In the drawings, wherein like reference characters refer to like parts throughout the several views:

Fig. 1 is a side elevation of one form of novel barograph embodying the invention;

Fig. 2 is a top plan view of the barograph shown in Fig. 1;

Figs. 3 and 4 are detail plan views of one form of temperature compensating means embodying the invention, illustrating the effect of varying temperature upon the temperature responsive element;

Fig. 5 is a fragmentary detail sectional plan view illustrating the disposition of one form of temperature responsive element of the invention with respect to the barograph and the oscillatory shaft;

Fig. 6 is a fragmentary detail sectional side elevation of the arrangement shown in Fig. 5;

Fig. 7 is a view similar to Fig. 6 showing the arrangement of one form of the invention with a diaphragm;

Figure 8:
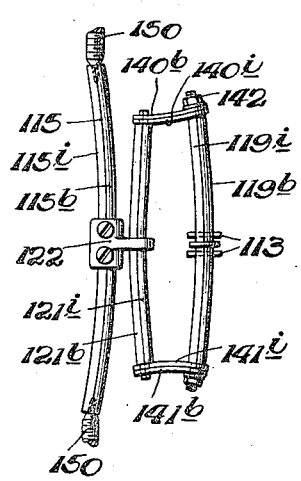
Figs. 8 and 9 are detail plan views of another embodiment of the invention, illustrating the effects of varying temperatures thereon.
Figure 10:
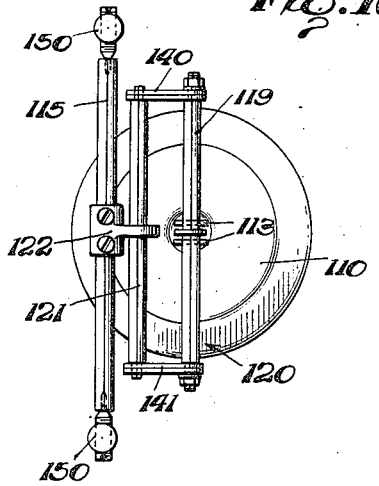
Fig. 10 is a top plan view of the embodiment of Figs. 8 and 9 as applied to the pressure responsive element.

The present invention, as will be readily apparent from the following detailed description, is adaptable to a great variety of instruments wherein corrections are rendered necessary due to errors produced by changes in temperature, the invention being illustrated in the accompanying drawings, by way of example only, in the form of a barograph. The latter comprises an atmospheric pressure responsive element such as an expansible and contractible evacuated bellows 10 contained in a housing 11 provided with an atmospheric vent 12, said bellows being sealed to render the same responsive to changes in external pressures exerted thereon and having suitable resilient means (not shown) therein for expanding the same upon decrease in external atmospheric pressure. A rigid post or link 13 is pivotally secured at one end thereof to the bellows 10 for movement therewith and at its other end to an arm 19 of a novel temperature responsive device generally designated as 20. A motion multiplying linkage is provided which is adapted to amplify the relatively small movements of the bellows and thus produce a readily readable indication or graphic record of such movement.

The linkage may be of any suitable and well known construction comprising an arm 14 secured to a rotatable shaft 15 outside of casing 11. A sleeve 16 rigidly secured to the casing 11 acts as a bearing and a support for shaft 15. A block 43 provides a clamping member for shaft 15 on the outer side of the arm 14.

Link 13 is connected to one arm 19 of the novel temperature compensating device 20, to be more fully described hereinafter, while shaft 15 is connected to the other arm 21 of element 20 by means such as the member 22. The distance between the central axis of shaft 15 and the central axis of link 13 constitutes the effective lever length for the movement of arm 14. A tension spring 23 connected to the central portion of arm 14 and to table 18 is provided to eliminate loose-play and back-lash. Said spring also functions in conjunction with balance-weight 24 on arm 14 to minimize vibration and eliminate position error as when the instrument is in an inverted position.

The other end of arm 14 is provided with a laterally extending pin 25 which slidably engages a slot 26 in a vertically extending link 27 that is operatively connected at its upper end to an indication pointer or stylus carrying arm 28. The latter is fixedly mounted on a rotating shaft 44 extending between a pair of posts 29 and has its weight so distributed that the free end 35 of pointer 28 thereof will drop under the influence of coil spring 45 when element 10 expands and imparts upward movement to arm 14 and pin 25. When the bellows element 10 contracts, pin 25 moves downwardly and engages the lower end of slot 26 to thereby raise the free end of pointer 28, i. e., to pivot the same in a clockwise direction as viewed in Fig. 1. It is to be noted that the pin 25 is always engaged with the end of slot 26 on the first traverse downward or upward of arm 28. The end 30 of arm 28 is so constructed as to constitute a balance-weight having a function corresponding to that of weight 24.

In order to make pointer 28 move through a complete up and down cycle during the range of expansion of the bellows element 10 and a complete cycle during the contracting movement thereof, a vertically extending link 31 having an elongated slot 32 for slidably receiving a pin 33 mounted on arm 14 is pivotally suspended from one end of a rocker member 34 which is fixedly mounted on the shaft 44 supporting pointer 28. The other end of member 34 is operatively connected to shaft 44. Slot 32 is of such length that when the free end of pointer 28 reaches the lower extent of its range of movement, pin 33 will engage the upper end of said slot so that continued upward movement of lever 14 and said pin will be effective through link 31 and arm 34 to raise the indicating end of the pointer. In view of the fact that the linkage connections do not, in themselves, constitute any part of the present invention and, since the type of linkage shown is well known in the art, it is believed to be unnecessary to illustrate and describe such linkage in more detail.

The free end of pointer 28 is provided with a stylus or recording pen 35 which is adapted to engage a chart 36 mounted on a rotatable drum 37. Arm 28 is preferably flexible and resilient in a lateral direction so that the stylus will be yieldingly held against the chart 36. A post 38, adjustably mounted on table 18, constitutes means for moving arm 28 out of contact with the chart. Any suitable means such as a clock mechanism 39 may be employed for rotating drum 37.

In instruments of the above character, the coefficient or the modulus of elasticity of the metal of the bellows and of the springs used in combination therewith varies with the temperature, thereby causing the bellows to assume different positions for a given pressure at various temperatures, and causing the range of movement thereof for a unit change of atmospheric pressure to vary with temperature changes.

One common method for compensating the instruments for variations of temperature is by sealing within the bellows a suitable quantity of dry air or other inactive gas. Compensation may be made in this matter for a given predetermined pressure but, to attain very accurate results, a great amount of time and skill is required to make the many tests which must be made, the correct amount of gas to enclose being determined in each individual instrument by trial and error. Even though accurate compensation may be effected in this manner for a given pressure, this correction is not maintained at all pressures because the range of movement of the pressure element and, hence, of the indicating pointer increases at higher temperatures and decreases at lower temperatures. This variation in range of movement is caused by the variation in the coefficient of elasticity of the resilient parts of the pressure element and to the change in the volume within the pressure element, the latter resulting in different external pressures.

The novel temperature responsive means comprehended by the present invention are such that when the instrument is only approximately compensated in the above manner, residual compensation for the temperature changes may be made, whereby the range of movement of the indicating pointer is maintained substantially constant irrespective of temperature changes. In one illustrative embodiment of the invention, as shown by Figs. 3 and 4, such means are constituted by a normally rectangularly shaped member or compensating device 20 having two bimetallic arms 19 and 21 jointed together at their ends by means of bi-metallic strips or cross-arms 40 and 41. The arms and cross-pieces of device 20 are preferably made of pieces of invar 19i, 21i, 40i and 41i, and like pieces of brass 19b, 21b, 40b and 41b, and are so arranged as to give an outward buckle of arms 21 and 19 and inward buckle of strips 40 and 41 during a period of temperature rise as illustrated in Fig. 3, and to permit inward buckling of arms 19 and 21 and outward buckling of strips 40 and 41 during a period of low temperature as illustrated in Fig. 4. Other suitable metals may, of course, be employed and the shape may be other than the cylindrical form shown.

Referring now more particularly to Fig. 5, it will be noted that even though shaft 15 is secured to arm 21 of device 20 by means of member 22, the axis of rotation of shaft 15 remains stationary irrespective of the bending or buckling movements of device 20 in response to temperature changes. The movement or amount of bend of an element for a given change of temperature is determined by the kinds and relative amounts of metals employed therein as well as by the length and diameter or thickness of the arms and cross-pieces of device 20. The proper dimensions for the arms and cross-pieces to render the same effective to compensate for the average loss or gain in movement of the pressure element due to changes of temperature may be determined by experiment. If desired, the device 20 may be so constructed as to be straight at a predetermined normal temperature and adapted to bend in one direction for subnormal temperatures and in the other direction for abnormal temperatures.

To render the device 20 capable of compensating for the variation in the range of movement of the pointer 28, arm 14 is secured to shaft 15 outside of the housing 11 by block 43. The other end of shaft 15 is secured to arm 21 of the device 20, while arm 19 of the device is secured to the pressure responsive element 10 by means of link 13. It is to be expressly understood, however, that the pressure responsive element can be other than the expansible bellows 10 as, for example, diaphragm 10' illustrated in Fig. 7.

The effective lever length is variable and constitutes the distance between the central axis of shaft 15 and the parallel central axis at the center of arm 19. The buckling of device 20 either inwardly or outwardly will then change the effective lever length without causing rotatable movement of pointer 28 when pressure is constant, said change being effective, however, to vary the motion multiplication ratio of the linkage which transmits the motion from pressure responsive element 10 to pointer 28. For example, when the instrument is subjected to abnormal or high temperatures, the device 20 buckles outwardly as shown in Fig. 3 thereby extending the effective lever length for a same rotation of shaft 15 because of increased expansion of the pressure element. Accordingly, when the temperature is lowered, the effective lever length between arms 19 and 21 becomes smaller as shown in Fig. 4, thereby rendering the same rotation of shaft 15.

The foregoing arrangement has been considered under varying pressures of element 10 and upon lengthening of the lever length at high temperature, the device 20 acts to reduce the multiplication ratio of the linkage and hence compensates for the increased expansion of bellows 10. When the temperature is low and the expansion of the pressure element is decreased at varying pressure, device 20 is effective to shorten the lever length and thus increase the multiplication ratio of the motion transmitting linkage.

The movement of the free end of pointer 28 may accordingly be maintained error-free for given changes in the pressure acting on element 10 irrespective of temperature changes.

As pointed out above, the extent of the bending movement of device 20 per unit change in temperature depends upon the diameter and length of arms 21 and 19 and the thickness and length of strips 40 and 41. Means are provided in the form of strips or cross arms 40 or 41 securely fastened to the ends of arms 19 and 21 by means such as screws 42, or the like. These screws may be loosened when it is desired to revolve one or both arms to a new bending position for proper temperature compensation.

To correct for any residual error in a predetermined pressure after element 10 has been approximately compensated for temperature changes by sealing a quantity of dry air therein, device 20 may be restored with the arms 19 and 21 with the brass portions 19b and 21b uppermost fully or partly. When the temperature of the surrounding air is below normal the expansion of element 10 for a given pressure is less than at normal temperature, the effect of this decreased expansion being to cause stylus 35 to move upwardly upon its correct position for the existing pressure. Under these conditions, the element 20, when it is in the position as described, will bend downwardly, thereby pivoting arm 14 to shaft 15 in a counter-clockwise direction and lowering stylus 35 to its correct position. The reverse action takes place when the temperature is above normal. It will, of course, be understood that the direction of residual error for subnormal and abnormal temperatures may be the reverse of the assumed above depending upon a quantity of dry air that is sealed in pressure element 10. If the error is reversed the correction will likewise be reversed by turning element 20 so that the Invar pieces 19i and 21i face upwardly.

To better understand the function of element 20, reference is made to Fig. 6 of the drawings. The effective lever length is designated therein by the letter $a$. When the instrument is subjected to low temperature inward buckling of element 20 sets in, causing counter-clockwise movement of link 13. The distance $a$ is thereby shortened and the rotation of shaft 15 remains the same. Upon increase in temperature, on the other hand, the link 13 moves slidingly in a clockwise direction thereby lengthening the effective lever length $a$. Under the latter condition the rotation of shaft 15 is still the same. These deviations due to either abnormal of subnormal temperatures represent the additional movement to that of pressure element 10 compensating for temperature variation.

Figure 9:
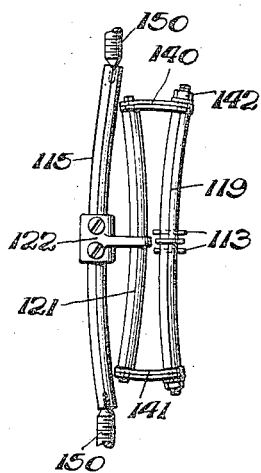

Figs. 8 and 9 illustrate another form of the invention. Parts corresponding to parts illustrated in Figs. 3 and 4 are designated by the same numerals plus one hundred (100).

In all respects the element 120 is similar to that above described but in addition to that element, further compensation for temperature variation is provided in the use of a rocking bimetallic shaft 115 secured to lever 14 in a suitable manner similar to that disclosed in Patent No. 2,165,744, issued July 11, 1939.

Figure 11:
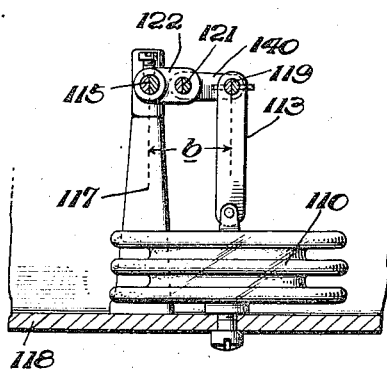
Fig. 11 is a side elevation, partially in section, of the device shown in Fig. 10.

As disclosed, shaft 115 is preferably provided with conical recessed end portions which receive the conical end portions of bearing bolts or screws 150, the latter being threaded through the upper ends of a pair of trunnions or posts 117 which are rigidly secured to the support table 118. In cooperation with element 120 secured to pressure responsive chamber 110 is the bi-metallic shaft 115 secured to the former by means of the member 122. In this embodiment the effective lever length is that provided by the longitudinal axis of movable shaft 115 of the parallel axis of arm 119 of element 120 this length being designated by the letter $b$ in Fig. 11. Shaft 115 is provided with a strip of invar 115i and a strip of brass 115b. In operation, as the temperature lowers, the arms 119 and 121 buckle toward each other as disclosed in Fig. 9 and shaft 115 buckles away from the element 120 thus moving the point of application of the component of force away from the link 113 rendering greater movement of arm 114 while in case of a higher temperature the elements assume the position illustrated in Fig. 8 and in this case with the arms of element 120 buckling outwardly the shaft 115 buckles inwardly thus moving the point of force application toward link 113 which decreases the movement of pointer 128. The same function and result of the amplification linkage ratio is obtained in this case as in the hereinabove described first embodiment for achieving temperature compensation.

There are thus provided novel means adapted particularly for use in combination with precision instruments, whereby errors introduced by changes in temperature may be compensated for, said means being of simple construction and inexpensive to manufacture. The novel means provided, may of course, be employed in any type of instrument or apparatus for varying the amplification ratio of a motion transmitting linkage in accordance with changes in temperature. Additionally, said means are readily adjustable and capable of giving correct indications in different localities in which the normal conditions of pressure and temperature are different.

Although only two embodiments of the invention have been illustrated and described in detail, it is to be expressly understood that various changes may be made therein. For example, the arm 14 may constitute the indicating or recording pointer thereby providing a relatively small amount of motion amplification, and it is not necessary that the pressure responsive element be first approximately temperature-compensated in the manner pointed out. Other changes may also be made in the design and arrangement of parts illustrated, without departing from the spirit and scope of the invention as will now be apparent to those skilled in the art. For a definition of the limits of the invention, reference is to be had primarily to the appended claims.

What is claimed is:

1. In combination, indicating means, pressure responsive means, a motion amplifying linkage connected to said indicating means, said motion amplifying linkage including a rock-shaft supporting a lever of said linkage, and a temperature responsive device comprising a plurality of bi-metal elements interconnected at their ends, one of said elements being connected to said rock-shaft and the other of said elements being connected to said pressure responsive means, said elements being normally spaced apart and adapted to define a variable lever arm for actuating said rock-shaft during varying temperatures.

2. In apparatus of the class described, means responsive to changes in conditions or operations, indicating means, motion amplifying means comprising a rock-shaft and linkage connecting said change responsive means to said indicating means for actuation of the latter by the former, and temperature responsive means included in said motion amplifying means comprising a pair of spaced parallel bi-metal elements having their ends connected together and adapted to bend toward and away from each other upon changes in temperature thereby defining a variable lever arm between said rock-shaft and said change responsive means, one of said elements being connected to said rock-shaft and the other being connected to said change responsive means.

3. In combination, a pair of movable members, motion amplifying means including a rock-shaft for transmitting motion from one of said members to the other, and temperature compensating means included in said motion amplifying means comprising a pair of spaced parallel bi-metal elements having their ends connected together, one of said elements being connected to said rock-shaft and the other of said elements being connected to said one member, said elements being adapted to bend toward and away from each other upon changes in temperature, thereby varying the lever arm defined by said elements between said rock-shaft and said one member in accordance with temperature change.

4. In combination, means responsive to changes in conditions or operations, a pair of parallel rock-shafts, one of which is of bi-metal, a motion amplifying linkage connecting said rock-shafts, a pointer connected to one of said rock-shafts, a temperature responsive device comprising a plurality of spaced interconnected bi-metal elements connecting said change responsive means to said other rock-shaft, said last-named rock-shaft and said device defining a variable lever arm for transmitting motion from said change responsive means to said pointer in accordance with changes in temperature, and means enclosing said temperature responsive device and said change responsive means, with an end of said other rock-shaft projecting from said enclosing means.

5. A temperature responsive element comprising a plurality of bi-metallic arms adapted to bend inwardly with respect to each other under one temperature condition and outwardly at another temperature condition, and bi-metallic means interconnecting said arms to normally maintain said arms in spaced parallel relation relative to each other and adapted to bend with said arms under varying temperature conditions.

6. In combination, a pair of movable members, a motion amplifying linkage for transmitting motion from one of said members to the other, said linkage including a rock-shaft rotatably supporting a lever of said linkage, and temperature responsive means comprising a plurality of bi-metal elements interconnected at their ends, one of said elements being connected to said rock-shaft and the other being connected to said one movable member, said elements being normally spaced apart in parallel relation and adapted to define a variable lever arm for actuating said rock-shaft during varying temperatures.

7. In combination, a pair of movable members, a motion amplifying linkage for transmitting motion from one of said members to the other, said linkage including a rock-shaft rotatably supporting a lever of said linkage, and temperature responsive means comprising a plurality of bi-metal elements interconnected at their ends, one of said elements being centrally connected to said rock-shaft and the other of said elements being centrally connected to said one movable member, said elements being normally spaced apart in parallel relation and adapted to define a variable lever arm for actuating said rock-shaft during varying temperatures.

8. In combination, a pressure responsive device, a pointer, a rock-shaft, and means connecting said device and pointer through said rock-shaft whereby the movement of said device is normally transmitted to said pointer according to one ratio, said connecting means including temperature responsive means comprising a bi-metallic element connected with said rock-shaft and a second bi-metallic element connected with said device, said elements being interconnected at their ends and being normally parallel with and spaced apart from each other whereby upon changes in temperature said elements buckle toward or away from each other thus varying the movement of the rock-shaft from said device according to another ratio.

9. In combination, indicating means, pressure responsive means, a motion amplifying linkage connected to said indicating means, a bi-metallic rock-shaft supporting a lever of said linkage, said rock-shaft being adapted to bend in one direction during increased temperatures and in an opposite direction during decreased temperatures, and temperature responsive means comprising a bi-metallic element connected with said rock-shaft and a second bi-metallic element connected with said pressure responsive means, said bi-metallic elements being interconnected at their ends and normally parallel with and spaced apart from each other, said rock-shaft and said bi-metallic elements defining a variable lever arm for transmitting motion from said pressure responsive means to said indicating means in accordance with changes in temperature.

10. In combination, indicating means, pressure responsive means, a motion amplifying linkage connected to said indicating means, a bi-metallic rock-shaft supporting a lever of said linkage, said rock-shaft being adapted to bend in one direction during increased temperatures and in an opposite direction during decreased temperatures, and temperature responsive means comprising a bi-metallic element centrally connected to said rock-shaft and a second bi-metallic element centrally connected with said pressure responsive means, said elements being interconnected at their ends and being normally parallel with and spaced apart from each other whereby upon changes in temperature said elements buckle toward or away from each other, said rock-shaft and said bi-metallic elements defining a variable lever arm for transmitting motion from said pressure responsive means to said indicating means in accordance with changes in temperature.

11. A temperature responsive device comprising a pair of bi-metallic arms normally spaced apart and adapted to bend during varying temperaures, and bi-metallic means for interconnecting the ends of one of said arms with the respective ends of the other of said arms whereby said means aids in the bending action of said arms during said varying temperatures.

WILLIAM G. BOETTINGER.